July 29, 1952  L. E. SAUER  2,605,311
REACTOR
Filed Dec. 20, 1950
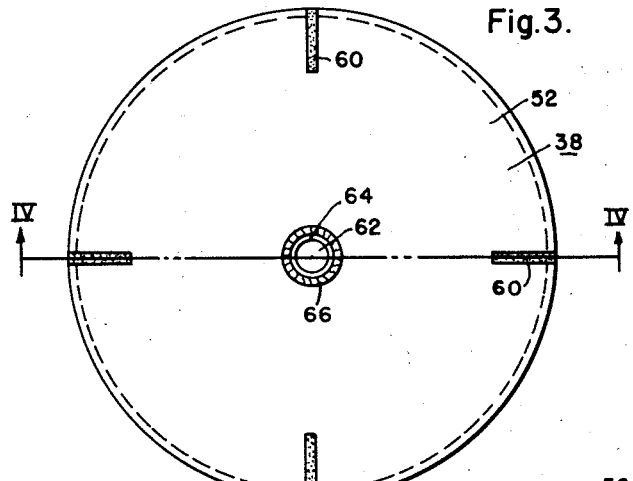
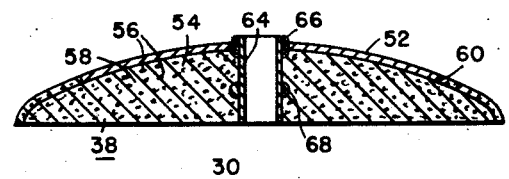
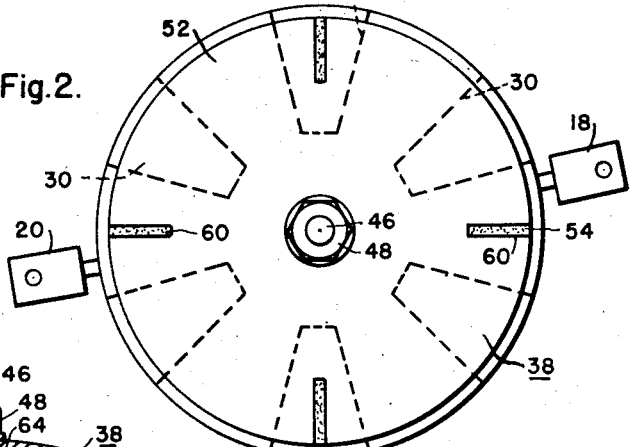
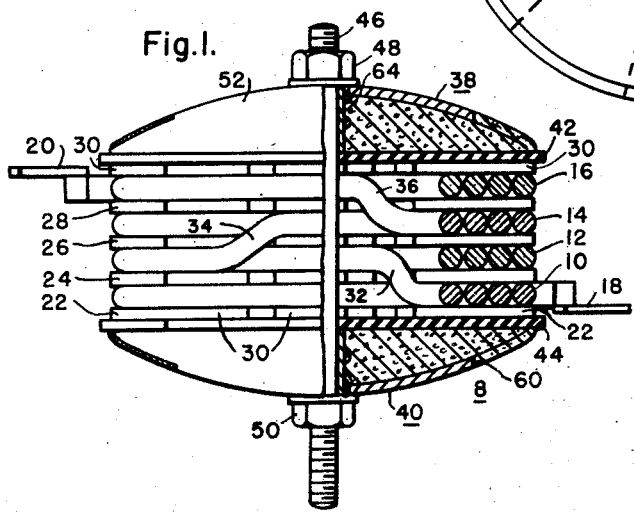
INVENTOR
Louis E. Sauer.
BY
James N. Ely
ATTORNEY Patented July 29, 1952

2,605,311

UNITED STATES PATENT OFFICE 2,605,311

REACTOR

Louis E. Sauer, Sharon, Pa., assignor to Westinghouse Electric Corporation, East Pittsburgh, Pa., a corporation of Pennsylvania Application December 20, 1950, Serial No. 201,817

7 Claims. (Cl. 171—242)

This invention relates to reactors and in particular to magnetically shielded current limiting reactors.

In motor circuits or the like, associated starters or breakers are utilized for interrupting the circuits under predetermined operating conditions. Such circuits have grown in capacity to the point that short circuit current encountered may exceed the interrupting ability of the starter or breaker associated with the circuit. Thus current limiting reactors have been used to limit the short circuit current to a value that can be handled by the interrupting device.

In practice, the current limiting reactors are usually coils of heavy copper having an air core. Usually such reactors are mounted in insulated cabinets or else it is necessary to provide magnetic shielding for the reactors. Where the reactor is mounted in an uninsulated cabinet, unless the reactor is magnetically shielded, the stray flux on prolonged overloads or heavy short circuits causes localized heating of the cabinet walls or the large magnetic stresses encountered actually causes physical damage to the cabinet and associated structure.

Many attempts have been made heretofore to satisfactorily magnetically shield the reactors but such attempts have not met with absolute success. The best known of the prior art magnetically shielded reactors fails to provide sufficient shielding with the result that the unrestrained magnetic field produces arcing, excessive heating and excessive forces in the metal enclosing cabinet. In some instances, even at short circuit currents below the published rating of the reactor, the coils of the known reactors actually tear themselves loose from the mounting.

An object of this invention is to provide a reactor having protective end caps thereon to effect magnetic shielding of the reactor.

Another object of this invention is to provide a reactor with composite end caps capable of confining the flux at normal current and of controlling the flow of or substantially containing the flux under short circuit conditions.

Another object of this invention is to provide protective end caps for a reactor, the end caps utilizing a mass of intimately mixed ferro-magnetic particles of metal and cement for substantially confining the flux at normal currents and a low resistance member for controlling and/or substantially containing the flux under short circuit conditions.

Other objects of this invention will become apparent from the following description when taken in conjunction with the accompanying drawing, in which:

Figure 1 is a view in elevation and partly in section of a current limiting reactor embodying the teachings of this invention;

Fig. 2 is a top plan view of the reactor of Fig. 1;

Fig. 3 is a top plan view of one of the end caps of the reactor; and

Fig. 4 is a view in section of the end cap taken along the line IV—IV of Fig. 3.

Referring to the drawing and in particular to Fig. 1, this invention is illustrated by reference to a current limiting reactor shown generally at 8. In this instance, the current limiting reactor 8 is formed of a plurality of layers 10, 12, 14 and 16 of heavy copper conductors, the layers being interconnected so as to give a continuous winding and the ends of the windings being provided with terminals 18 and 20.

In order to provide for ventilating and insulating the layers 10, 12, 14 and 16 from one another, a plurality of spaced spacer members 22, 24, 26, 28 and 30 are associated with the layers, the spacers 22 to 30 being of a suitable insulating material such as limited fibrous material impregnated with a resinous binder. As more clearly shown in Fig. 2, the spacers 30 disposed about the upper surface of the layer 16 of conductors are evenly spaced about the layer, six of such spacers 30 preferably being utilized on one side of the layer 16. The spacers on the opposite sides of and between the other layers forming the reactor 8 are similarly disposed so that effective air spaces or ventilating channels are provided between the different layers.

In forming the layers 10, 12, 14 and 16 of the conductive windings, the different layers are progressively connected so as to give a continuous circuit throughout the assembled layers. Thus the inner turn of the layer 10 is transposed to the inner turn of the second layer 12 as illustrated at 32, the outer turn of the layer 12 being transposed as at 34 to the outer turn of the layer 14 and the inner turn of the layer 14 is transposed as at 36 to the inner turn of the layer 16.

In order to provide for magnetically shielding the windings of the reactor 8, protective end caps 38 and 40 are provided on the opposite ends of the assembled layers of the conductive windings. These protective end caps are similar in construction and are of a size to cover the ends of the conductive windings of the reactor 8. The specific structure of the end caps 38 and 40 will be described more fully hereinafter.

In assembling the end caps 38 and 40 on the ends of the assembled layers 10, 12, 14 and 16 of the conductive windings, an insulating spacer member 42 and 44 is disposed between the end caps 38 and 40, respectively, and the associated ends of the conductive windings to effectively insulate the end caps from the windings. The spacer members 42 and 44 are in the form of a flat plate disc having a diameter slightly larger than the diameter of the end caps and the outer diameter of the layers 10, 12, 14 and 16 as clearly shown in Figs. 1 and 2, the spacer members 42 and 44 being disposed to seat against the spaced spacer members 30 and 22, respectively.

When the end caps 38 and 40 are thus positioned on the opposite ends of the conductive windings of the reactor 8, they are secured in position as by means of a stud 46 which extends through the assembly. Each end of the stud 46 is threaded for accommodating nuts 48 and 50 so that when the nuts 48 and 50 are tightened thereon, the end caps 38 and 40 will be securely held in position seated against the insulating discs 42 and 44, respectively, on the ends of the assembled layers of conductive windings of the reactor 8.

In order that the end caps 38 and 40 may provide adequate shielding for the reactor 8, each of the end caps 38 and 40 is formed of a composite structure as more clearly illustrated in Figs. 3 and 4 of the drawing. Thus for example the end cap 38 is formed of an outer shield 52 of low resistance material such as carbon steel which is of a substantial dish-shape and which contains a mass 54 therein formed of particles 56 of ferro-magnetic metal intimately mixed and bonded as by means of a binder 58 such as Portland cement.

In forming the end cap 38 or 40, the dish-shaped shield 52 is provided with a plurality of cuts or slots 60 spaced about the periphery thereof and extending inwardly therefrom, such slots being effective in reducing circulating eddy currents and losses under normal currents when the reactor 8 is energized. In the assembly illustrated, four of the slots 60 are satisfactory for reducing such circulating eddy currents.

The shield 52 is also provided with a central opening 62 though which a sleeve 64 extends, the sleeve 64 having a length sufficient that its inner end will terminate in the same plane as the edges of the dish-shaped shield 52. In order to secure the sleeve 64 in its assembled position with respect to the shield 52, the end of the sleeve 64 is suitably welded as at 66 to the shield 52. The sleeve 64 is also provided with a projection or irregular outer surface 68, the purpose of which will be explained more fully hereinafter.

In making the end cap 38 or 40, the shield 52 is placed upon a vibrator table (not shown) in a position to receive the components of the mass 54. The mass 54 is formed of any suitable ferro-magnetic metal in the form of fine particles 56 and a quick setting Portland cement 58. In forming the particles 56, it is found that cuttings, such as result from the milling of transformer steel such as grain oriented silicon iron is suitable. Such millings as a general rule will have an average size of about $\frac{7}{8} \times .013 \times .026$ inch. It is, of course, appreciated that the size of the cuttings will depend upon the width of the milling cutting tooth, the thickness of the silicon iron being milled and the feed speed of the cutter. When particles are formed especially for use in making the mass 54, it is preferred that the particles be a circular shape of approximately 100 mesh size. Commercial production, however, dictates the use of filings or cuttings which would normally be considered as waste material in the making of transformers.

Where such cuttings are utilized, it is found that they must be heated to a temperature of about 500° C. to effectively burn off all organic matter that may be present on the filings. Thereafter, the cuttings or filings are mixed in the proportion of about three parts of cuttings to about two parts of Portland cement by volume in a dry state until a uniform mixture is obtained. After such mixture is formed, then about two gallons of water is added to the mixture for every three gallons of the Portland cement contained in the mixture. The resulting mixture is then well mixed to obtain a uniform consistency.

When the wet mixture of the ferro-magnetic metal cuttings and cement is added to or is placed in the inverted shield 52 which is contained on a vibrator table, it is found that the cement appears to act as a lubricant to the metallic particles and permits them to settle compactly in the dish-shaped shield 52. When vibrated for about two minutes, it is found that the mixture has filled all voids in the shield 52 and is quite compact, the excess water in the mixture rising to the top where it can be readily removed.

After such mixture is poured and vibrated in the shield 52 as described, it is allowed to sit for about one to one and one-half hours during which time the excess water is removed from the top surface of the mix at least three times. Thereafter, the shield 52 containing the mass 54 is placed in a suitable humidor and allowed to remain therein undisturbed for at least 16 hours, after which it is found that a very compact homogeneous solid mass 54 is formed in the shield 52. The irregular surface or projections 68 on the outer surface of the sleeve 64 is embedded in the solidified mass 54, with the result that such irregular surface tends to lock the mass 54 in its cured or set position in the shield 52. It is also to be noted that the mixture of ferro-magnetic metal particles and cement also fills the spaced slots 60 formed in the outer edge of the shield 52. In securing the end caps 38 and 40 thus formed in position with respect to the conductive windings of the reactor 8, the stud 46 is preferably of silicon bronze or some other non-magnetic high resistance material.

In practice, it is found that the end cap 38 or 40 has a definite magnetic permeability and is quite effective in confining or controlling the flux when the reactor 8 is energized either under normal current conditions or under short circuit current conditions. With the end caps 38 and 40 constructed as described, it is found that the mass 54 contains the particles of magnetic material, which particles have relatively low loss and are effective for confining the majority of the flux at normal or low currents close to the conductive windings of the reactor 8 and that the shield 52 forming the outer surface of the end caps 38 or 40 being of low resistance will function to confine practically all of the coil end flux at normal current to the particles of ferro-magnetic metal in the mass 54. Where excessive currents are encountered, the end cap 38 or 40 resists the actual passage of flux beyond the end cap and the shield 52 thereof functions to direct the passage of flux which escapes the end cap 38 or 40 in a direction which more nearly parallels the wall (not shown) of the cabinet in which the reactor is normally mounted. Under such conditions, the heating effects and the forces applied to the cabinet are small even under short circuit current conditions.

It is to be noted that in the shield 52 forming the outer surface of each of the end caps 38 and 40 that the center portion of the shield 52 constitutes a short circuited turn which functions to effect additional external flux reduction under short circuit conditions. In actual practice, the slots 60 are of a length such that the short circuited part of the shield 52 extending between the ends of the slot 60 and the sleeve 64 has an area approximately equal to the inside diameter of the layers 10, 12, 14 and 16 forming the conductive windings of the reactor 8.

In practice, it is found that the reactor provided with the end caps as described is very effective for limiting the current under short circuit conditions and can be used in an uninsulated cabinet since the flux is either confined within the end caps or is so limited and directed as to be parallel to the outer surface of the end caps. The reactor of this invention is relatively simple in construction and can be readily reproduced by anyone skilled in the art.

I claim as my invention:

1. In a reactor, the combination comprising, a stack of interconnected layers of conductive windings, spacer members of insulating material disposed between the layers of conductive windings, protective end caps disposed on the opposite ends of the stack, each of the end caps comprising, a substantially dish-shaped metallic shield, a mass of particles of ferro-magnetic metal and cement disposed in the shield to fill the dish-shaped shield, the metallic shield having a plurality of inwardly extending spaced slots about the periphery thereof to limit the circulation of eddy currents in the shield, and means for maintaining the protective end caps in cooperative relation with the stack of conductive windings.

2. In a reactor, the combination comprising, a stack of interconnected layers of conductive windings, spacer members of insulating material disposed between the layers of conductive windings, protective end caps disposed on the opposite ends of the stack, each of the end caps comprising, a substantially dish-shaped shield of carbon steel, a sleeve centrally disposed to project inwardly of the dish-shaped shield and being secured thereto, the sleeve having an irregular outer surface, a solid mass formed of an intimate mixture of particles of ferro-magnetic metal and cement disposed about the sleeve to fill the dish-shaped shield, the irregular outer surface of the sleeve cooperating with the mass to lock the mass in position in the shield, and non-magnetic means extending through the sleeves of the end caps and the reactor for maintaining the protective end caps in cooperative relation with the stack of conductive windings.

3. In a reactor, the combination comprising, a stack of interconnected layers of conductive windings, spacer members of insulating material disposed between the layers of conductive windings, protective end caps disposed on the opposite ends of the stack, each of the end caps comprising, a substantially dish-shaped metallic shield, a sleeve centrally carried by the shield and disposed to extend therethrough to the plane of the edges of the shield, the sleeve having an outwardly extending projection thereon, a mass of particles of ferro-magnetic metal and cement disposed in the shield about the sleeve to fill the dish-shaped shield, the projection of the sleeve cooperating with said mass to lock the mass in position in the shield, and non-magnetic means extending through the sleeves of the end caps and the reactor for maintaining the protective end caps in cooperative relation with the stack of conductive windings.

4. In a reactor, the combination comprising, a stack of interconnected layers of conductive windings, spacer members of insulating material disposed between the layers of conductive windings, protective end caps disposed on the opposite ends of the stack, each of the end caps comprising, a substantially dish-shaped metallic shield, the shield having a plurality of inwardly extending spaced slots about the periphery thereof to limit the circulation of eddy currents in the shield, a sleeve centrally carried by the shield and disposed to extend therethrough to the plane of the edges of the shield, the sleeve having an outwardly extending projection thereon, a mass of particles of ferro-magnetic metal and cement disposed in the shield about the sleeve to fill the dish-shaped shield, the projection of the sleeve cooperating with said mass to lock the mass in position in the shield, and non-magnetic means extending through the sleeves of the end caps and the reactor for maintaining the protective end caps in cooperative relation with the stack of conductive windings.

5. In a reactor, the combination comprising, a stack of interconnected layers of conductive windings, spacer members of insulating material disposed between the layers of conductive windings, protective end caps disposed on the opposite ends of the stack, each of the end caps comprising, a substantially dish-shaped shield of carbon steel, the shield having a plurality of inwardly extending spaced slots about the periphery thereof to limit the circulation of eddy currents in the shield, a sleeve centrally disposed to project inwardly of the dish-shaped shield and being secured thereto, the sleeve having an irregular outer surface, a solid mass formed of an intimate mixture of particles of ferro-magnetic metal and cement disposed about the sleeve to fill the dish-shaped shield, the irregular outer surface of the sleeve cooperating with the mass to lock the mass in position in the shield, and non-magnetic means extending through the sleeves of the end caps and the reactor for maintaining the protective end caps in cooperative relation with the stack of conductive windings.

6. In a reactor, the combination comprising, a stack of interconnected layers of conductive windings, spacer members of insulating material disposed between the layers of conductive windings, protective caps disposed on the opposite ends of the stack, each of the caps comprising, a shield of low resistance material which constitutes a short-circuited turn and a mass of magnetic particles embodied in a solidified binder disposed between the shield and the end layer of the conductive windings in cooperative relation, and means for maintaining the protective caps in cooperative relation with the stack of conductive windings.

7. In a reactor, in combination, a plurality of layers of a wound conductor, the layers of the wound conductor being electrically connected, spacer members of insulating material disposed between the layers of the wound conductor, a mass of solid material disposed in line with and substantially coextensive with the layers of the wound conductor, magnetic material in particle form dispersed through the mass of solid material, the outer surface of the mass of material being convex, a layer of conducting material disposed over and in close association with the convex surface of the mass of material, the layer of conducting material serving to accumulate eddy currents caused by magnetic flux concentrated in the mass of material carrying the magnetic particles whereby the magnetic flux is centered in the mass of solid material disposed in line with the layers of the wound conductor.

LOUIS E. SAUER.

REFERENCES CITED

The following references are of record in the file of this patent:

UNITED STATES PATENTS

| Number | Name | Date |
| --- | --- | --- |
| 1,436,968 | Lennox | Nov. 28, 1922 |
| 1,747,507 | George | Feb. 18, 1930 |
| 2,372,950 | Holmberg et al. | Apr. 3, 1945 |

FOREIGN PATENTS

| Number | Country | Date |
| --- | --- | --- |
| 440,468 | Great Britain | Dec. 31, 1935 |